United States Patent Office 3,716,349
Patented Feb. 13, 1973

3,716,349
METHOD FOR PRODUCING LASER GLASSES HAVING HIGH RESISTANCE TO INTERNAL DAMAGE AND THE PRODUCT PRODUCED THEREBY
Emil W. Deeg, Woodstock, Conn., and Elias Snitzer, Wellesley, and Arnold J. Simpson, Southbridge, Mass., assignors to American Optical Corporation, Southbridge, Mass.
No Drawing. Filed May 17, 1971, Ser. No. 144,238
Int. Cl. C03b 5/16
U.S. Cl. 65—32    7 Claims

ABSTRACT OF THE DISCLOSURE

Laser glass which has high resistance to internal damage resulting from inclusions is produced by a method which includes the bubbling of either pure oxygen or an oxidizing oxygen-rich gas mixture through the melt during at least a portion of the stirring operations in order to maintain an oxidizing environment throughout the melt to prevent the reduction of any material in the melt to metallic or semiconductive states.

BACKGROUND OF THE INVENTION

This invention is related to the production of laser glasses and is more particularly concerned with a method of producing high quality laser glasses which are highly resistant to inclusion type internal damage when utilized in laser configurations operating at high energy densities.

A laser is a source of a highly coherent, high intensity beam of electromagnetic radiation. The radiation is considered, in general, to be light although the output spectrum, through which known laser materials emit, ranges from the infrared to the ultraviolet. Many types of lasers are capable, in certain configurations, of emitting an output beam having a very high power density. These range from the very high average power continuous wave $CO_2$ gas lasers to the Q-switched solid state lasers. The average power output is, of course, very different. However, the energy density during operation is the parameter of present interest.

Most solid laser materials, glass and crystal, contain particles, both microscopically visible and sub-microscopic, which are not homogeneous with the surrounding matrix. Many of these inclusions are of the order of one micrometer in diameter or less and as such are not discernable by visual means. When a laser beam or other mode of high energy density radiation is generated within, or transmitted through the material, energy is absorbed by the material of the inclusions. These inclusions absorb energy at a faster rate and to a higher degree than does the surrounding matrix material. Therefore, the small localized matter expands more quickly than does the matrix material until a fracture occurs due to the thermally induced forces which occur. This fracture may be very small or it may be catastrophic depending upon the size and nature of the originating inclusion and the operating conditions.

High optical quality glass has been manufactured traditionally in platinum containers. Early laser glasses were produced likewise in platinum crucibles. It soon became evident, however, that microscopic particles of metallic platinum appeared in all glasses made in a platinum crucible, and that those particles served as damage sites to the passage of intense laser beams. Subsequently, it was established that a large part of the platinum contamination in the glasses arose through condensation of platinum oxide vapor from the atmosphere over the glass melt and that this could be reduced greatly by the introduction of dry nitrogen gas instead of air over the molten glass. This led to improved thresholds for damage, but incomplete elimination of the platinum contamination problem. For this reason, the best laser glasses have been manufactured in a platinum-free environment in ceramic crucibles.

However, it has been found that laser glasses which are produced in all ceramic systems are also susceptible to internal damage from sub-microscopic inclusions. It has been found that this damage occurs where particles of various ingredients have been reduced to semi-conductive or even metallic states.

One approach to solving this problem which has afforded improvement is set forth in a copending application Ser. No. 801,800, filed Feb. 24, 1969, by E. W. Deeg and R. E. Graf, and assigned to the assignee of the present application. This approach is to assume only strongly oxidizing conditions for the fabrication of laser glasses.

A second, related approach to the solution of the aforementioned problem which has afforded some additional improvement is set forth in a second copending application, Ser. No. 63,593, filed Aug. 13, 1970, by E. W. Deeg and E. Snitzer and is also assigned to the assignee of the present application. In this method, all of the surfaces of the ceramic utensils which contact the laser glass during melting are rendered free of reducing components by a variety of pretreatments.

SUMMARY OF THE INVENTION

Accordingly, it is an object of the present invention to provide an improved method for producing laser glass having high resistance to internal damage caused by microscopic and sub-microscopic inclusions in the laser glass.

A second object of the invention is to provide such a method which is complementary to the methods set forth in the aforementioned copending applications.

Another object of the invention is to provide laser glass of high optical homogeneity and low bubble content produced in accordance with such a method.

Briefly, the invention, in its broadest aspect, comprises a method for producing laser glasses having high resistance to internal damage from inclusions, the laser glass being prepared using ceramic utensils, and the succeeding operations being performed. Laser-glass-forming batch constituents are placed in the ceramic utensils for melting. The batch is melted in the ceramic utensils while an oxidizing condition is maintained throughout and over the batch, the oxidizing condition throughout the batch being maintained by bubbling an oxidizing oxygen-rich gas through the melt during at least a portion of the stirring. The oxidizing condition over the batch is maintained by the provision of an oxidizing oxygen-enriched environment. Laser glass is then recovered which is resistant to internal damage.

Further objects, advantages, and features of the invention will be apparent from the following detailed specification.

DETAILED DESCRIPTION OF THE PREFERRED EMBODIMENTS

The nature of the sub-microscopic inclusions found in those laser glasses which have been produced in many of the all ceramic melting systems of the prior art is not yet completely understood. It appears that the inclusions are particles of either metallic or semiconductive matter which have been reduced during the melting procedure. It has been found that the crucible or other ceramic utensils in contact with the melt, such as the stirrer, either directly introduce reducing components into the melt or contain reducing components on those surfaces thereof which contact the glass during melting. These components produce reducing particles in the glass which are responsible for some of the localized damaging inclusions. In addition, many laser glasses contain components therein which per se are of a reducing nature and tend to create the aforementioned sub-microscopic inclusions in the laser glass. It has been found that the inclusion type damage in laser glasses which are produced in high purity ceramic crucibles from oxidizing batch constituents can be further reduced by providing strongly oxidizing conditions within the glass melt preferably during the reaction phase, but not excluding the fining and homogenization phases.

These oxidizing conditions are provided by the bubbling of oxidizing gas or gas mixtures through the melt during the aforementioned phases combined with the maintenance of an oxidizing atmosphere over the melt.

It is preferable that the bubbled oxidizing oxygen-rich gas be dispersed uniformly throughout the melt and this is achieved within the preferred embodiment of the invention by bubbling the oxidizing oxygen-rich gas through an aperture at the base of a hollow stirring rod. Such a stirrer design as well as the construction of a suitable all-ceramic melting apparatus is shown in a copending application, Ser. No. 14,599, filed Feb. 26, 1970, by C. G. Silverberg, now Pat. No. 3,669,435 issued June 13, 1972, and again is assigned to the assignee of the present application. The teachings of this application as well as the two aforementioned copending applications are incorporated herein by reference.

There are two primary reasons for utilizing such a stirrer configuration for introducing the oxidizing oxygen-rich gas into the laser glass melt. The first of these is to cause the gas mixture to be widely dispersed throughout the melt. The second reason is that it appears that the action of the stirrer as it approaches the ceramic crucible at various times during the stirring process may cause the introduction into the melt of the aforementioned particles from the surface of the ceramic crucible. If the oxidizing gas mixture is present at the time that these particles from the crucible are introduced into the mixture, they may be immediately oxidized, thus preventing the subsequent reduction of any particles within the melt to either a metallic or semiconductive state.

Although less desirable, it is possible to introduce the oxidizing oxygen-rich gas into the melt through an aperture in the lower portion of the crucible. This, combined with the stirring of the melt during most of the process, serves to distribute the gas evenly throughout the melt.

Pure oxygen is the preferred gas for bubbling through the melt; however, oxygen-rich gas mixtures containing at least 75 volume percent oxygen are included within the purview of the invention.

It has been found to be of additional advantage to maintain oxidizing conditions throughout the entire melter during the process in addition to the bubbling process described hereinabove. Oxygen-enriched air, 50 volume percent oxygen and 50 volume percent air, as the gas utilized for maintaining an oxidizing atmosphere over the melt has proven to be as effective as pure oxygen. Here, the oxygen content of the oxidizing oxygen-enriched environment should be at least 50 volume percent.

Although it might be possible to eliminate mechanical stirring of the glass melt if the bubbling is accomplished by some other means, it is not recommended in order to maintain a reasonably short period for homogenization. In other words, such a method is not considered practical at the present time.

It is also foreseen that the method of the present invention is complementary to those set forth in the aforementioned applications. That is, it is recommended that the batch constituents be chosen, whenever possible, to be of an oxidizing nature. In addition, it is recommended that the ceramic utensils be treated in the manner set forth in the copending application in order to remove reducing particles from the surface of such ceramic utensils.

A laser glass having the composition set forth in Table I herebelow was produced by the method of the invention. The apparatus in which the laser glass was produced is shown in the aforementioned copending application Ser. No. 14,599. The quantity of each of the oxides contained within the laser glass are set forth in the table in weight percent.

TABLE I

| | |
|---|---|
| $SiO_2$ | 67 |
| $Na_2O$ | 8 |
| $K_2O$ | 11 |
| $BaO$ | 4 |
| $Al_2O_3$ | 2 |
| $ZnO$ | 2 |
| $Li_2O$ | 1 |
| $CeO_2$ | 2 |
| $Nd_2O_3$ | 3 |

To avoid dusting and to reduce volatilization losses of batch constituents during the reaction phase of the melt, all batches were pelletized. The batch was filled at a rate of approximately 3.5 pounds per hour into a mullite crucible which was preheated to 2,550° F. The filling and raection phase took place over a period of approximately 15.5 hours. At the conclusion of the filling and reaction phase, the temperature was reduced over a period of 3.5 hours to 2,450° F. An oxygen bubbling phase of approximately 12 hours followed during which time the temperature remained at approximately 2,450° F. This temperature remained constant through the succeeding fining phase, which lasted approximately 17.5 hours. Subsequently, the temperature was reduced to approximately 2,020 °F. over a period of approximately 15 hours. The succeeding homogenization and conditioning phase lasted approximately 41 hours and was conducted at the aforementioned temperature of 2,020° F. The glass was then transferred through a bottom orifice in the crucible to a vertical drawing machine. The rod of laser glass thus produced was approximately 7.5 centimeters in diameter and 120 centimeters in length. The rod was annealed according to standard practice. The atmosphere in the melter throughout the process was oxygen-enriched air.

Although the stirring operation was maintained in the melt throughout the duration of the filling and reaction phase, the oxygen bubbling phase, the fining phase, and the homogenization and conditioning phase, the actual bubbling of pure oxygen was conducted only through the intermediate oxygen bubbling phase. During this period, the oxygen was bubbled through a 1 millimeter diameter hole in the ceramic stirrer located below the level of the lower blade of the stirrer. The stirring was maintained during the bubbling phase to distribute the gas throughout the melt. Although it is within the purview of the invention to maintain the oxygen bubbling throughout the stirring operation, it is preferable that the oxygen bubbling be limited to a specific phase as was done in the present instance so that all bubbles of gas may be removed from the melt during the fining operation. This is necessary in order that a laser glass billet of good optical quality may be produced.

Optical inspection of the billet of laser glass produced according to the above procedure indicated a small striated area at the periphery. Over 50 percent of the total volume of the billet was of excellent optical quality with the local variation of the refractive index ($n_D$) below $\pm 5 \times 10^{-6}$. A damage test was performed on the billet with a laser beam of 1.06 micrometer wavelength according to the procedure set forth in copending application, Ser. No. 47,197, filed June 18, 1970 by J. W. Kantorski and C. G. Young, now Pat. No. 3,639,066 issued Feb. 1, 1972, and which is also assigned to the assignee of the present application. The pulse duration of the laser beam in this test was approximately 45 nanoseconds and contained a specific energy of 70 joules per square centimeter. This test resulted in a damage spot level of approximately 12 per liter of laser glass. Billets of the same glass and of the same optical quality which had been prepared according to the aforementioned procedure excepting the step of bubbling oxygen through the melt, produced more than ten times the number of damage spots per liter when tested under the same conditions.

As a further check on the results produced with the billet of glass produced according to the preceding example, the same procedure was repeated in preparing a second laser glass billet of identical composition and optical quality except that the duration of the oxygen bubbling cycle was reduced to approximately 9 hours. A damage test, identical to that performed on the first billet, resulted in an average of 52 damage spots per liter. Although the decrease of approximately 3 hours in the duration of the oxygen bubbling phase produced a definite increase in the number of damage spots produced, the marked improvement in both of the examples from the previous level of damage encountered without utilization of the bubbling operation is extremely significant.

The two examples set forth hereinabove demonstrate that the method of the present invention is very successful for a specific glass composition. However, there is no reason whatsoever to believe that an equivalent improvement cannot be achieved with any others of the multitude of laser glasses which are melted in ceramic crucibles by utilizing the oxidizing oxygen-rich gas bubbling process in combination with an oxidizing oxygen-enriched furnace atmosphere.

While there have been shown and described what are considered to be preferred embodiments of the present invention, it will be obvious to those skilled in the art that various changes and modifications may be made therein without departing from the invention.

We claim:

1. A method for producing laser glass having high resistance to internal damage from metallic and semiconductive inclusions, the glass being prepared using ceramic utensils and comprising the steps of:
    placing laser-glass-forming batch constituents in the ceramic utensils for melting;
    melting the batch constituents in the utensils;
    stirring the melted batch constituents continually;
    bubbling an oxidizing oxygen-rich gas including at least 75 volume percent oxygen through the melted batch constituents during at least a portion of the stirring to provide a strongly oxidizing condition throughout the melted batch;
    maintaining an oxidizing oxygen-enriched environment including at least 50 volume percent oxygen over the melted batch constituents; and
    recovering laser glass which is thereby resistant to internal damage as the formation of metallic and semi-conductive inclusions has been prevented by the strongly oxidizing conditions maintained throughout and over the laser glass while in a melted condition.

2. A method according to claim 1, in which the oxidizing oxygen-rich gas is essentially pure oxygen and the oxidizing oxygen-enriched atmosphere is composed of approximately 50 volume percent oxygen and 50 volume percent air.

3. A method according to claim 1, in which the oxidizing oxygen-rich gas is bubbled through a hole in the base of a hollow-stemmed stirrer.

4. A method according to claim 1, in which the bubbling of the oxidizing oxygen-rich gas is commenced after the batch constituents have been melted.

5. A method according to claim 4, in which the additional steps of fining the melted batch to remove bubbles and homogenizing the melted batch are performed following termination of the bubbling of the oxidizing oxygen-rich gas.

6. A method according to claim 1, in which the batch constituents are chosen to be of an oxidizing nature.

7. A laser glass produced according to the method of claim 1.

References Cited

UNITED STATES PATENTS

| | | | |
|---|---|---|---|
| 3,149,946 | 9/1964 | Elmer | 65—32 |
| 3,434,863 | 3/1969 | Hansen et al. | 65—32 X |
| 3,445,256 | 5/1969 | Dalton | 65—134 X |
| 3,446,659 | 5/1969 | Wisman et al. | 65—32 X |
| 3,573,895 | 4/1971 | Ostberg | 65—134 X |
| 3,582,307 | 6/1971 | Mulfinger et al. | 65—134 X |
| 3,656,924 | 4/1972 | Chapman et al. | 65—134 X |
| 2,387,222 | 10/1945 | Wright | 65—32 |

FRANK W. MIGA, Primary Examiner

U.S. Cl. X.R.

65—134, 157, 178, 33; 107—47